April 28, 1936.  A. L. FOELL  2,039,075
VALVE
Filed April 3, 1934   3 Sheets—Sheet 1

Inventor
Adolph L. Foell.
By Ruley & Watts.
Attorney

April 28, 1936. A. L. FOELL 2,039,075
VALVE
Filed April 3, 1934 3 Sheets-Sheet 2

Inventor
Adolph L. Foell.
By Richey & Watts
Attorney

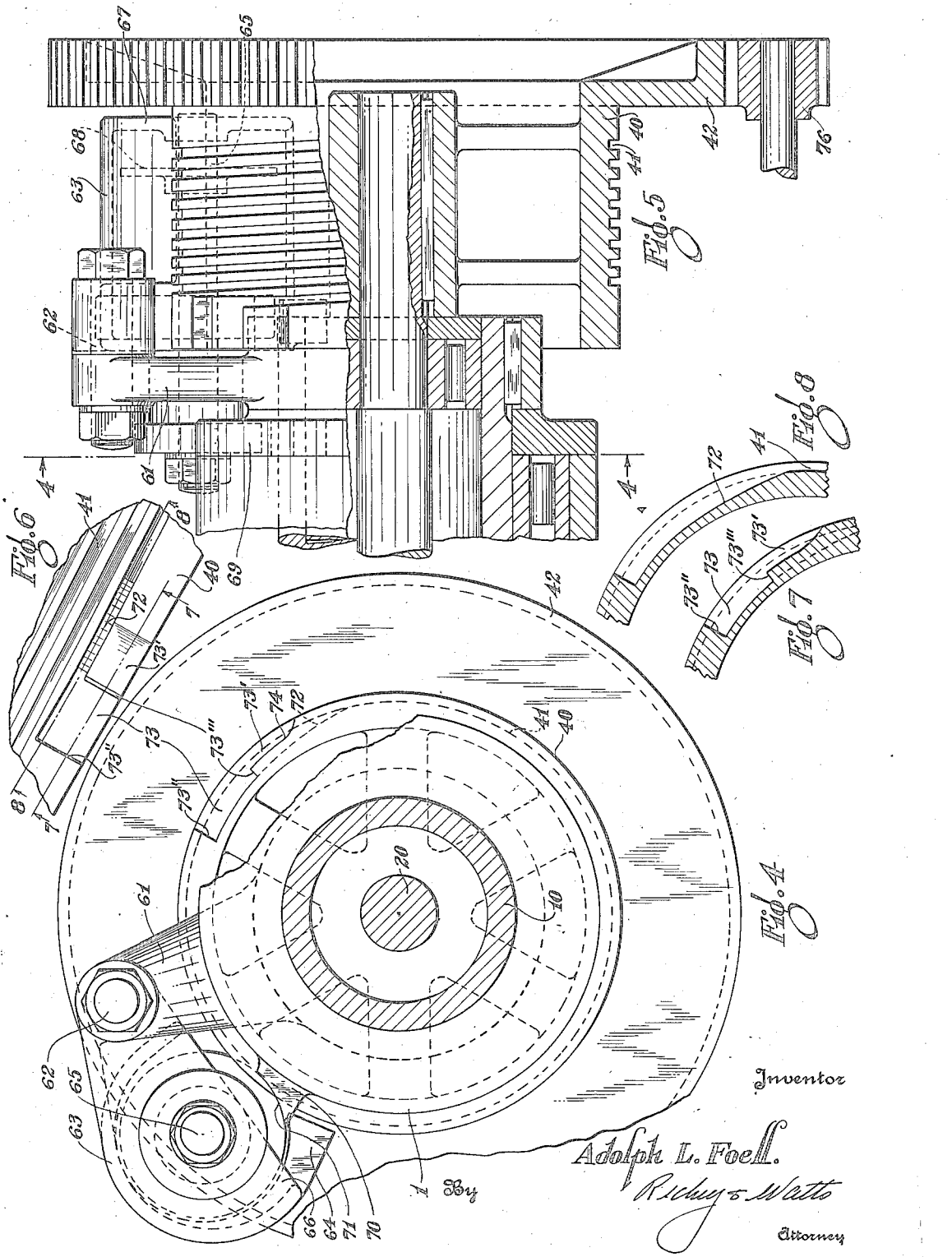

Patented Apr. 28, 1936

2,039,075

UNITED STATES PATENT OFFICE 2,039,075

VALVE

Adolph L. Foell, Cleveland Heights, Ohio

Application April 3, 1934, Serial No. 718,809

9 Claims. (Cl. 251—11)

This invention relates to valves and more particularly to valves adapted to control the flow of fluid through large pipe lines. Although my improved valve may be made in various sizes it is particularly adapted for use with relatively large diameter pipe lines such as those which are commonly used to convey blast furnace gas or the like.

A number of different types of valves have been used to control the flow of fluid through large pipe lines. All of these with which I am familiar, however, have certain disadvantages. In most of the old style valves the valve proper is not as strong as the pipe connected thereto and therefore expansion joints must be supplied in the pipe to prevent damage to the valve due to expansion and contraction of the pipe, and it is among the objects of my invention, therefore, to provide a valve of the type described having a body as strong or stronger than the pipe line connected thereto, thus eliminating the necessity for expansion joints.

Other objects of my invention are; the provision of a valve, particularly adapted for large pipe lines, which does not require a separate support, provided, of course, that the pipe line is properly supported; the provision of a valve which is equally effective regardless of the direction in which the pipe line extends, that is, regardless of whether the pipe line be horizontal, vertical or at any intermediate angle; the provision of a valve which is easily adapted for either hand or motor operation; the provision of a valve construction in which the valve body may be ventilated by a circulation of air, when the valve is closed, to insure the safety of men working in the pipe line on the off side of the valve; the provision of a valve which occupies a minimum of space, is of simple construction, positive in action and particularly adapted for economical upkeep and operation; and to provide a valve which may be water sealed and may be easily lubricated and which will retain lubricants for relatively long periods of time whereby the valve may be readily operated after long periods of disuse.

The above and other objects of my invention will appear from the following description of a preferred form thereof, reference being had to the accompanying drawings, in which—

Figure 4 is an enlarged fragmentary view of my valve control apparatus taken on line 4—4 of Figure 1, but illustrating the mechanism in valve closed position.

Figure 5 is a side view, partly in section, of the control apparatus shown in Figure 4.

Figure 6 is a fragmentary plan view of the grooved drum of the control mechanism.

Figure 7 is a cross section taken on line 7—7 of Figure 6.

Figure 8 is a cross section taken on line 8—8 of Figure 6.

Figure 1:
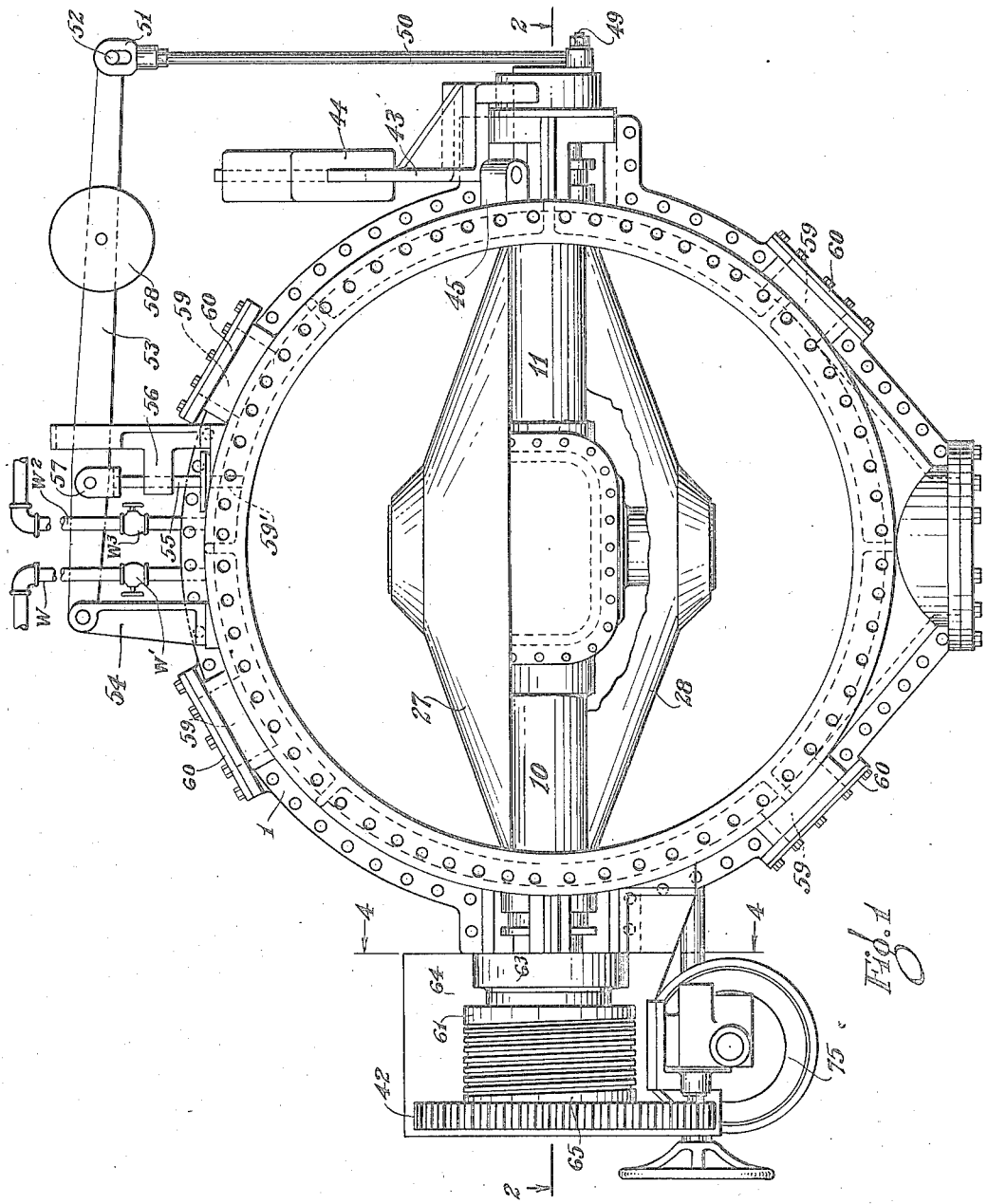
Figure 1 is an end view of my improved valve showing the valve in fully opened position.
Figures 2, 3:
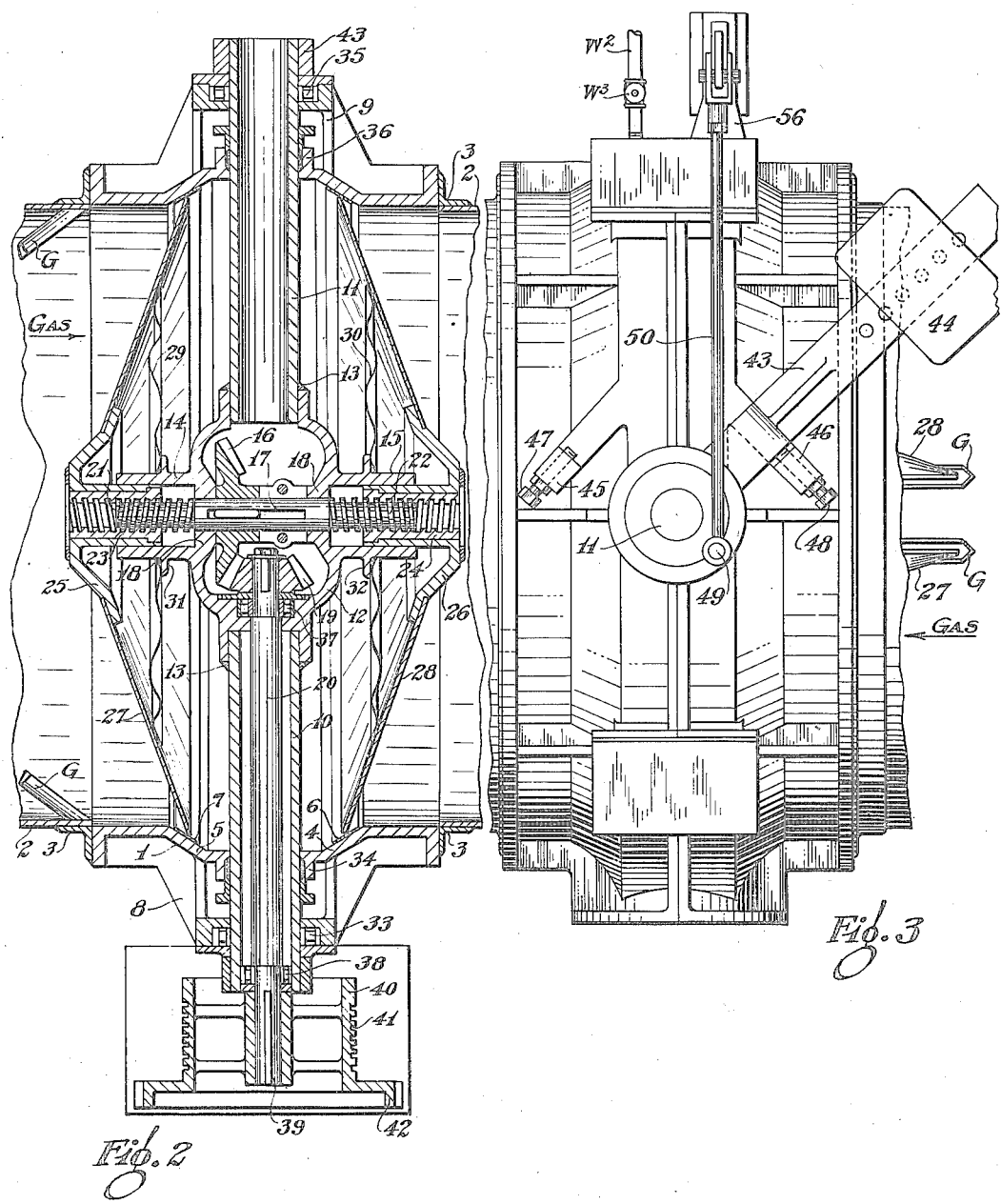
Figure 2 is a horizontal section taken on line 2—2 of Figure 1 but differing from Figure 1 in that it illustrates the valve in its fully closed position.
Figure 3 is a side elevation of my valve in open position showing the counterweight and automatic venting apparatus.

Referring now to Figures 1, 2 and 3 it will be seen that the main housing 1 of the valve is substantially cylindrical in form and of approximately the same diameter as the pipe line 2 in which the valve is inserted. The spaced ends of pipe 2 are adapted to be secured to the opposite sides of the housing 1 in any suitable manner, such as by welding the angle iron rings 3 to the pipe and securing these to the valve housing. The central portion of the housing 1 is of slightly greater diameter than the end portions and is provided with inclined annular faces 4 and 5 to which are preferably welded the wear resisting seats 6 and 7 of alloy steel or the like.

Bearing supporting brackets 8 and 9 respectively are disposed on diametrically opposite sides of the housing 1 and are adapted to rotatably support the tubular trunnion members 10 and 11. The gear casing 12 connects the inner ends of the tubular members 10 and 11 and, as it is preferably welded to the tubes 10 and 11 as at 13, a rigid hollow shaft having a central gear box is provided, this shaft being trunnioned in the bearing brackets 8 and 9. The gear box 12 is made with oppositely extending tubular portions 14 and 15. A bevel gear 16 is keyed to the transverse shaft 17 which is rotatably mounted in bearing portions 18 of the gear box 12 and is adapted to engage the bevel pinion 19 which is keyed to the inner end of the operating shaft 20. The outer ends 21 and 22 of the shaft 17 are provided with screw threads of opposite pitch which threads engage corresponding threads in the sleeves 23 and 24 respectively. These sleeves 23 and 24 are adapted to slide in the tubular portions 14 and 15 of the gear housing 12 and have outwardly projecting end flange members 25 and 26 of generally frusto-control contour. Secured to the portions 25 and 26 of the threaded sleeves 23 and 24 are the closure plates or discs 27 and 28. As is clearly seen in Figures 1 and 2 these discs are dished and their outer peripheries are adapted to engage the angle seats 7 and 6 respectively of the housing 1. The outer edges of the discs 27 and 28 may also be made of wear resisting alloy steel or other material suitable to provide the proper sealing engagement between the peripheries of the disc and the valve body. When the shaft 28 is rotated it will transmit motion to the shaft 17 through the bevel gears 19 and 16 and will cause the threaded portions 21 and 22 to either spread apart or draw together the sleeve members 23 and 24 together with the closure discs 27 and 28. In order to positively prevent leakage of gas to the atmosphere through the gear box 12 and the tubular trunnions 10 and 11 and to prevent rotation of the sleeves 23 and 24, and consequently the discs 27 and 28, when the threaded shaft 17 is rotated, the corrugated flexible diaphragms 29 and 30 are provided. The outer edges of these diaphragms are secured, preferably by welding, to their respective discs 27 and 28 and the inner edges secured to flanges 31 and 32 on the portions 14 and 15 of the gear box 12. It will be understood by those skilled in the art that in place of the diaphragms 29 and 30 the sleeves 23 and 24 might be keyed to portions 14 and 15 of the gear box to prevent relative rotation and a stuffing box provided to prevent leakage of gas.

The bearing bracket 8 is preferably provided with a roller or other anti-friction bearing 33 and a stuffing box 34. The bracket 9 is similarly equipped with a bearing 35 and stuffing box 36. The stuffing boxes 34 and 36 are adapted to provide a gas tight joint between the rotatable sleeves or trunnions 10 and 11 and the housing 1. The bearings 33 and 35 facilitate rotation of the trunnions 10 and 11 together with the gear box 12 and the entire closure disc assembly and maintain this assembly in its proper position in relation to seats 6 and 7, as will be later described.

Supporting the inner end of the shaft 20 is a bearing 37 mounted in the gear housing 12. The outer end of shaft 20 is rotatably supported by a suitable bearing 38 and it will be seen from Figure 2 that this shaft is enclosed by and is rotatable within the tubular trunnion member 10. On the outer end 39 of the shaft 20, which projects out beyond the bearing bracket 8, is secured what may be termed a grooved drum 40. The outer face of this drum 40 is provided with a groove 41, preferably of rectangular cross section, which is cut in the face of the drum in the form of a screw thread or helix and the driving gear 42 is shown as integrally formed with the drum 40.

To protect the edges of the discs 27 and 28 from the abrasive action of material carried in the gas I have provided the semi-circular guard angles G. As seen in Figures 2 and 3 these angles extend across the valve body on the upstream side and are positioned to act as guards for the upstream edges of the discs 27 and 28 when the valve is open.

Before proceeding with a description of the valve operating and controlling mechanism it will be well to describe the automatic venting and counterweight devices which are disposed on the opposite side of the housing 1 from the grooved drum 40. As is best seen in Figures 1 and 3 an outwardly extending arm 43 is secured to the outer end of and rotatable with the tubular trunnion 11. An adjustable counterweight 44 is disposed on the outer end of the arm 43. Stops or abutments 45 and 46 are formed on or secured to the valve housing 1 and are so disposed as to permit approximately 90 degrees of rotation of the arm 43 and, of course, the trunnions 10 and 11 together with the closure discs 27 and 28. Adjusting screws 47 and 48, equipped with suitable lock nuts, etc. are designed to provide accurate adjustment of the end positions of the arm 43 and consequently of the closure discs 27 and 28.

A pin 49 projects outwardly from the hub of the arm 43 at a point radially spaced from the axis of the trunnion 11. This pin 49 forms a supporting pivot for the lower end of the rod 50, the upper end of which carries a slotted member 51 engaging a pin 52 on the outer end of the lever arm 53. The opposite end of the lever arm 53 is pivotally mounted on a bracket 54 which is supported on the valve housing 1. A valve stem 55 extends through a guiding bracket 56 and is pivotally secured at its upper end 57 to the lever 53. A counterweight 58 is mounted on the lever 53 between the point of connection with the stem 55 and the outer end 52. The lower end of the stem 55 may be provided with any suitable form of closure member (not shown) and is adapted to close a vent hole 59' extending through the housing 1 of the valve structure between the two closure discs 27 and 28. When the main valve discs are in open position, as seen in Figure 1, the pin 49 is in its lowest position and the counterweight 58 holds the valve stem 55 in position to close the vent hole 59' in the housing 1. When the trunnions 10 and 11, together with the closure discs 27 and 28, are rotated through 90 degrees into the closed position seen in Figure 2 the pin 49 and the rod 50 will be lifted, the bottom of the slot in the member 51 will engage the stud or pin 52 and the lever 53, together with the valve stem 55 and its associated closure member will be lifted until the hole 59' is opened, thus permitting any gas which may leak through past the upstream seating disc 27 to escape to the atmosphere. It will be understood, of course, that when the valve is again opened the crank movement of the pin 49 will lower the rod 50 and permit the weight 58 to move the valve stem 55 to close the passage 59'. Other types of automatic venting valves, adapted to be operated by the main valve mechanism to vent the space between the discs when the main valve is closed, may be used without departing from the spirit of my invention.

In large pipe lines or such units as these lines may serve it is sometimes necessary for men to work in the pipe or in connected units and it is of great importance to protect them from the possibility of gas entering the section of pipe or connected units in which they are working. To secure positive protection I provide a number of openings 59 provided with removable cover plates 60. These openings extend through the housing 1 into the space between the closure discs 27 and 28. If, when the valve is closed and the members 27 and 28 are in seating engagement with the housing, the cover plates 60 of the openings 59 are removed, a complete and thorough ventilation of the space between the discs 27 and 28 will be provided. Thus, any gas which may leak past the disc on the gas side of the valve will be freed to the atmosphere thereby establishing atmospheric pressure on both sides of the other disc and thus eliminating all possibility of leakage into the section of the pipe or other connected units in which the men are at work. Under ordinary conditions, however, my automatic venting arrangement, above described, will provide sufficient ventilation for the valve to prevent any leakage of gas therethrough even though the seating of the discs against the housing is not absolutely perfect.

In some instances the venting to atmosphere of the space between the discs may not be considered sufficiently safe. To take care of such situations I have provided a water inlet pipe W controlled by valve W' and water overflow or outlet pipe W² controlled by a valve W³. As is seen in Figures 1 and 3 these pipes W and W² are connected to the space in the main valve housing between the closure discs 27 and 28. The inlet pipe W and the overflow pipe W² extend above the housing for a distance sufficient to provide a head of water at least as great as the pressure in the gas main on the upstream side of the pipe.

When it is desired to water seal the valve structure the slotted end 51 of the rod 50 will be disconnected from the pin 52 thus permitting the weight 58 to maintain the auxiliary vent valve in closed position. The valve W' will then be opened and the space between the closure discs 27 and 28 completely filled with water. The overflow valve W³ is also open and a continuous flow of water into the valve housing and out of the overflow pipe W² is maintained, thus I provide a complete water seal which may be used if desired or in order to comply with safety regulations existing in some plants which require a water sealed valve in certain situations.

Before describing in detail the specific apparatus which I have provided for operating my valve it will be well to understand the cycle of operation of the apparatus. If we assume that the valve is in closed position, as shown in Figure 2, and it is desired to place the valve in open position, as shown in Figure 1, it is first necessary to rotate the shaft 20 in the proper direction to cause the screw threads 21 and 22 to draw the closure discs 27 and 28 together and away from their seats 7 and 6. After the discs 27 and 28 are moved together a sufficient distance to permit rotation of the complete structure, the entire closure unit, including the discs, the tubular trunnions 10 and 11, the gear housing 12, etc. is rotated through approximately 90 degrees into the position shown in Figures 1 and 3, in which the valve is wide open and free passage of gas therethrough is permitted. To close the valve the reverse cycle of the above operation is carried out and the first movement will be the rotation of the complete structure from the horizontal position shown in Figures 1 and 3 into the vertical position of Figure 2. As soon as the discs reach the vertical position the shaft 20 is rotated in a direction to spread or separate the discs until they are firmly seated against their respective seats on the housing 1.

Referring now particularly to Figures 4, 5, 6, 7 and 8, the apparatus which controls the opening and closing movements of the parts includes the drum 40 having a threaded groove 41 in its face. As above noted this grooved drum is keyed or otherwise secured to the end of the shaft 20. Adjacent the inner end of the face of the drum 40 is an outwardly extending arm member 61 which is mounted upon the outer end of and adapted to rotate with the tubular shaft 10. An axially extending pin 62 is secured to the outer end of the arm 61 and a latch bracket 63 is pivotally supported on the pin 62.

A dog member 64 is formed on the latch 63 and a shaft 65 extends transversely across between the end walls 66 and 67 of the latch 63. It will be seen from the drawings that the latch 63 is shaped to form a housing or cover for the shaft 65 and for the traveling wheel or roller 68 which is mounted on the shaft 65 and adapted to slide longitudinally and rotate freely thereon. The shaft 65 extends out beyond the end plate 66 and a second wheel or roller 69 is rotatably mounted on this overhanging end of the shaft 65. The roller 69 is of smaller diameter than the roller 68 for reasons which will appear later. Secured to the valve housing 1 is an outwardly projecting lug 70 having a face portion 71 which is adapted to engage the roller 69 during the opening and closing movements of the valve, as will be later explained.

The bottom edge of the roller 68 fits in the spiral groove 41 which is formed in the surface of the drum 40 and rotation of the drum 40 will cause the roller 68 to rotate upon and to move longitudinally along the shaft 65. The thread or spiral groove 41 is cut or formed so that rotation of the drum 40 in valve opening direction (clockwise in Figure 4) will cause the roller 68 to move to the left from its position as shown in Figure 5. The left hand end of the groove 41 (Figure 5) is formed with a radially inwardly sloping cut-away portion 72 forming an inclined surface extending from the bottom of the groove 41 to the bottom of the notch 73. The notch 73 has a portion of reduced depth 73' at one end thereof and the bottom of this portion of reduced depth is curved to join the surface of the drum 40, as shown at 74.

When the parts are in the positions shown in Figures 4 and 5 the valve is fully closed. To open the valve the motor 75 is started and transmits its power through suitable gears to the pinion 76 which in turn drives the gear 42 which carries the drum 40. The motor 75 is of the reversible type and, to open the valve, is made to rotate in a direction to cause the drum 40, and the shaft 20 to which it is secured, to rotate in clockwise direction, as seen in Figure 4. Rotation of the drum 40 and shaft 20 in this direction will cause the discs 27 and 28 to be drawn toward each other and away from their seats upon the valve housing. This initial rotation of the drum 40 will also cause the roller 68 to travel along the shaft 65 until it reaches the downwardly sloping portion 72 of the groove 40. When the roller 68 reaches the portion 72, or rather when the portion 72 of the groove reaches the roller 68, the roller 68 together with the latch 63 will be permitted to swing inwardly upon the shaft 62. A suitable spring (not shown) may be provided to cause this movement or if the parts are sufficiently heavy, the force of gravity may be utilized. When the roller 68 rides down on the surface 72 the roller 69 will engage the surface 71 of the lug 70 thus preventing the latch 63 and the dog 64 from dropping completely down into the notch 73. However, further rotation of the drum 40 will cause the end 73'' of the notch 73 to engage the outer end of the dog 64. When this occurs further movement of the drum 40 in clock-wise direction will carry with it the arm 61, the latch 63 and the other elements carried thereby. During the initial movement of the latch 63 in clock-wise direction the roller 69 will be moved off of the lug 70 and the dog 64 will drop into fully engaged position in the notch 73. As the drum 40 continues to rotate the arm 61 will be carried to the right (Figure 4) and will, of course, carry with it the tubular trunnions 10 and 11, thus causing the entire valve structure to turn in opening direction on its transverse axis. The counterweight arm 43 and weight 44 will be carried with the shafts 10 and 11 and, when the arm 43 passes the vertical position, the weight 44 will assist in carrying the valve into its final wide open position. This weight may also cause the arm 61 to move in opening direction faster than it would be moved by the rotation of the drum 40, thus moving the dog 64 from its position in contact with the end 73'' of the notch 73 until the inner face of the dog 64 is in contact with the end 73''' of the notch 73. It will be noted that the width of the face of the dog 64 is less than the width of the notch 73 thus allowing a certain amount of relative motion between these parts. As soon as the valve member reaches its wide open position (Figures 1 and 3) a suitable limit switch (not shown but inserted in the motor circuit in well known manner) shuts off the current to the driving motor and the rotation of the drum 40 ceases. By making the slot 73 wider than the dog 64 any coasting of the parts is accommodated and danger of breakage due to too sudden stopping of the motor, etc. is avoided.

When the valve is in wide open position and it is desired to close it the reverse of the above noted operation takes place. The driving motor 75 is rotated in the opposite direction from that above noted, thus causing the drum 40 to rotate in counterclock-wise direction (Figure 4). Approximately the first 90 degrees of movement of the drum 40 will carry the arm 61, the trunnions 10 and 11 and the valve closure member from their horizontal or open position into their vertical or closing positions. The driving connection for this movement of the arm 61 is effected between the end 73''' of the notch 73 and the inner surface of the dog 64. The counterweight 44 assists in the closing movement of the valve structure after it has crossed its dead center in the same manner as described in connection with the opening of the valve. When the roller 69 strikes the inclined surface 71 of the lug 70 it is lifted thereby and this lifting action lifts the dog 64 away from the bottom of the notch 73 so that it will clear the end 73''' and be disposed in the shallow portion 73' of the notch. Further movement of the drum 40 in counterclock-wise direction will cause the inclined surface 72 to engage the roller 68 and lift it up to the level of the bottom of the groove 41. This lifting action will cause the dog 64 to be elevated completely out of the notch 73 and further rotation of the drum 40 will not affect the trunnion 10. The closure members 27 and 28 are now in their vertical or closing position. However, the drum 40 must be further rotated to cause the discs 27 and 28 to spread apart and be seated against their respective seats on the valve housing to completely close the valve. During this further rotation of the drum 40 the wheel or roller 68 will be carried along the shaft 65 (to the right in Figure 5) by the groove 41 until it again reaches the position shown in Figure 5. When the valve closure discs have become properly seated a torque limit switch, which is not illustrated but which may be of any desired and suitable type, becomes effective to stop the motor 75 when the desired closing force has been applied to seat the discs 27 and 28.

From the above description of the operation of my mechanism it will be seen that I have provided a valve which is entirely automatic in its operation and in which the operator need only throw a suitable switch in the proper direction to cause the driving motor to rotate in either opening or closing direction. It will be understood, however, that manually operated means may, if desired, be substituted for the driving motor 75. My enclosed gear box arrangement provides a structure which may be readily lubricated and which will retain lubricants for long periods of time. Thus the difficulties caused by sticking of the valves in the large pipes of a blast furnace plant, due to infrequent use, is eliminated by my lubricant retaining valve structure.

When my improved valve is mounted in a building or other enclosed space pipes may be provided extending from the venting openings to the atmosphere so that any gas which may leak past the upstream closure plate will be conducted out of the building eliminating all danger to workmen.

Although I have described the illustrated embodiment of my invention in considerable detail it will be understood by those skilled in the art that modifications and variations in the precise structure shown and described may be made without departing from the spirit of my invention. I do not, therefore, wish to be limited to the exact form herein shown and described but claim as my invention all embodiments thereof coming within the scope of the appended claims.

I claim:

1. In combination in a gas valve, a housing, spaced annular seats in said housing, spaced closure discs in said housing, means for moving said discs into and out of seating engagement with said seats to close and open the valve, and means, operable upon movement of said closure discs into seated position, for venting the space between said discs to atmosphere.

2. In combination in a gas valve, a housing, spaced annular seats in said housing, spaced closure discs in said housing, means for moving said discs into and out of seating engagement with said seats to close and open the valve, means for venting the space between said discs to atmosphere when said discs are moved into valve closing position, and operating connections between said disc moving means and said venting means whereby movement of said discs into valve closed position will open said venting means and movement of said discs into valve opened position will close said venting means.

3. In a valve of the type described, a housing, a tubular trunnion extending through the wall of said housing, a closure member carried by said trunnion, means carried by said trunnion for moving said closure member relative to said trunnion, said last named means including a rotatable shaft extending out of said housing through said tubular trunnion, a drum secured to the outer end of said shaft and having a spiral groove formed in its surface, a latch member secured to the outer end of said trunnion, a wheel supported by said latch member and adapted to run in said groove, said groove having portions of different depths whereby said wheel and groove coact upon rotation of said drum to move said latch toward and away from said drum to cause said latch to engage and disengage the drum to complete and break driving connections between said shaft and trunnion, and means for rotating said drum.

4. In a valve of the type described, a housing, a tubular trunnion extending through the wall of said housing, a closure member carried by said trunnion, means carried by said trunnion for moving said closure member relative to said trunnion, said last named means including a rotatable shaft extending out of said housing through said tubular trunnion, a drum secured to the outer end of said shaft and having a spiral groove formed in its surface, a latch member secured to the outer end of said trunnion, a wheel supported by said latch member and adapted to run in said groove, said groove having portions of different depths, and means for rotating said drum.

5. In combination in a valve, a housing, a tubular trunnion extending through the wall of said housing, a seat in said housing, a closure member carried by said trunnion, means for moving said closure member toward and away from said trunnion, said last named means including a rotatable shaft disposed within said trunnion and extending out of said housing, a drum secured to the outer end of said shaft, a gear secured to the inner end of said shaft, a threaded shaft extending transversely of said rotatable shaft, a gear on said threaded shaft engaging said gear on the inner end of said rotatable shaft whereby rotation of said rotatable shaft relative to said trunnion will cause said threaded shaft to rotate, a threaded member on said closure member engaging said threaded shaft, means for preventing relative rotation of said closure member and threaded shaft while permitting relative movement axially of said threaded shaft when said threaded shaft is rotated, and automatic means for interlocking said drum and said trunnion after said rotatable shaft has rotated to move said closure member a predetermined distance away from said seat.

6. In combination in a valve, a housing, a tubular trunnion extending through the wall of said housing, a seat in said housing, a closure member carried by said trunnion, means for moving said closure member toward and away from said trunnion, said last named means including a rotatable shaft disposed within said trunnion and extending out of said housing, a spirally grooved drum secured to the outer end of said shaft, a gear secured to the inner end of said shaft, a threaded shaft extending transversely of said rotatable shaft, a gear on said threaded shaft engaging said gear on the inner end of said rotatable shaft whereby rotation of said rotatable shaft relative to said trunnion will cause said threaded shaft to rotate, a threaded member on said closure member engaging said threaded shaft, means for preventing relative rotation of said closure member and threaded shaft while permitting relative movement axially of said threaded shaft when said threaded shaft is rotated, a latch member secured to said trunnion outside of said housing, said latch member being adapted to engage said groove in said drum, said groove having portions of different depths whereby said latch member and said drum will be interlocked during predetermined portions of the rotation thereof, and means for rotating said drum.

7. In combination in a valve, a housing, a tubular trunnion extending through the wall of said housing, a seat in said housing, a closure member carried by said trunnion, means for moving said closure member toward and away from said trunnion, said last named means including a rotatable shaft disposed within said trunnion and extending out of said housing, a spirally grooved drum secured to the outer end of said shaft, a gear secured to the inner end of said shaft, a threaded shaft extending transversely of said rotatable shaft, a gear on said threaded shaft engaging said gear on the inner end of said rotatable shaft whereby rotation of said rotatable shaft relative to said trunnion will cause said threaded shaft to rotate, a threaded member on said closure member engaging said threaded shaft, means for preventing relative rotation of said closure member and threaded shaft while permitting relative movement axially of said threaded shaft when said threaded shaft is rotated, a latch member secured to said trunnion outside of said housing, said latch member being adapted to engage said groove in said drum, said groove having portions of different depths whereby said latch member and said drum will be interlocked during predetermined portions of the rotation thereof, means for rotating said drum, and a guard extending across said housing on the upstream side thereof, said guard being positioned to protect said closure member when said closure member is in wide open position.

8. In a valve of the type described, a housing, a tubular trunnion extending through the wall of said housing, a closure member carried by said trunnion, means carried by said trunnion for moving said closure member relative to said trunnion, said last named means including a rotatable shaft extending out of said housing through said tubular trunnion, a spirally grooved drum mounted on said shaft outside of said housing, a latch member secured to said trunnion outside of said housing, means carried by said latch member and adapted to engage in said groove during rotation of said drum, said groove having portions of different depths, and means for rotating said drum.

9. In a valve of the type described, a housing, a tubular trunnion extending through the wall of said housing, a closure member carried by said trunnion, means carried by said trunnion for moving said closure member relative to said trunnion, said last named means including a rotatable shaft extending out of said housing through said tubular trunnion, a spirally grooved drum mounted on said shaft outside of said housing, a latch member secured to said trunnion outside of said housing, means carried by said latch member and adapted to engage in said groove during rotation of said drum, said groove having portions of different depths, and reversible means for rotating said drum.

ADOLPH L. FOELL.